June 7, 1927.

P. FAVOUR

MOTION PICTURE FILM STRIP

Filed Aug. 23, 1926

1,631,478

Paul Favour,
INVENTOR,

BY
ATTORNEYS.

Patented June 7, 1927.

1,631,478

UNITED STATES PATENT OFFICE.

PAUL FAVOUR, OF ROCHESTER, NEW YORK, ASSIGNOR TO EASTMAN KODAK COMPANY, OF ROCHESTER, NEW YORK, A CORPORATION OF NEW YORK.

MOTION-PICTURE-FILM STRIP.

Application filed August 23, 1926. Serial No. 130,805.

This invention relates to motion picture film and more particularly to such film as is furnished in a cartridge for daylight loading in a camera.

As thus furnished, a typical cartridge comprises a reel having wound thereon a band of film with protective paper bands attached to the ends thereof. This may be used in cameras of various types, typical examples being shown in the patents to Tessier, 1,572,252, granted Feb. 9, 1926, and Wittel 1,588,082 granted June 8, 1926.

In such apparatus, the film strip is fed in a self supported loop from a feeding means, such as a sprocket, to a gate through which it is advanced, and thence in another loop to a feeding means. At the gate, the film usually passes between spring pressed guide strips having apertures for the exposure and for the intermittent mechanism. There is a tendency for particles of emulsion to be scraped or dislodged from the sensitive layer and to be built up on the smooth guiding surfaces, thereby greatly increasing the friction between the film and the slideway, and also to pile up on the edge of the exposure window where it renders the edge of the exposed image rough and uneven. In a spring driven portable camera, this is particularly disadvantageous, as the springs are made as light as possible to increase the portability of the camera, and the increased friction due to this cause may become so great as practically to render the camera inoperative.

The objects of my invention are to decrease the tendency of the emulsion to be scraped off and to render the film at all times easily slidable through the gate.

The above and other objects are attained if a coating or deposit of wax is applied to only a small portion of the leader band. The passage of this wax on the leader band through the slideway prior to the passage of the sensitized film causes a very slight deposit of wax upon the slideway, sufficient, however, to cause the film to slide through without perceptibly increased friction, even when the gate remains uncleaned after long usage. This is particularly true when the waxed portion of the leader band is adjacent its point of union with the sensitized band.

Reference will now be made to the accompanying drawing wherein the same reference characters denote the same parts throughout.

Figure 1:
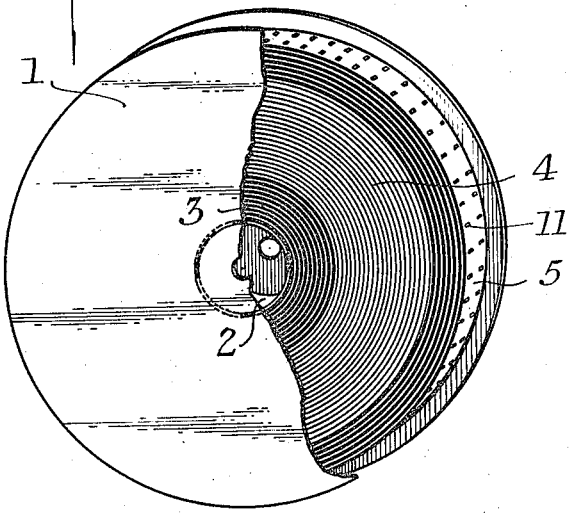
Fig. 1 is a perspective view of a reel of film embodying my invention, one flange being partly broken away.
Figure 2:
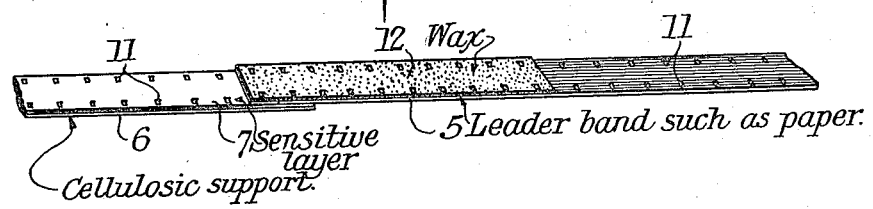
Fig. 2 is a perspective view on an enlarged scale of a fragment of the film strip showing the junction of the sensitized portion and the leader band, the thicknesses being much exaggerated.
Figure 3:
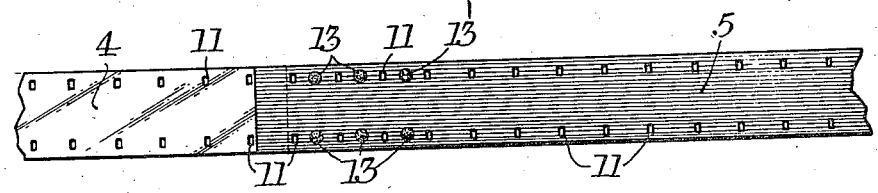
Fig. 3 is a plan of a fragment of the film strip showing the junction of the sensitized and protective bands and embodying another form of my invention.

The film cartridge, as furnished for camera use, comprises a reel having side flanges 1, and a core 2, upon which is wound a protective portion 3, coiled directly on the core, an unexposed sensitized film portion 4 attached at one end to the outer end of the protective portion 3 and an outer leader band or protective portion 5 attached at one end to the outer end of the coiled sensitized portion 4 and wound around it, the protective portions 3 and 5 thus forming continuations of the sensitized portion 4 and the three portions 3, 4 and 5 constituting in effect a single, coiled strip having the usual perforations 11.

The sensitized portion consists, as is usual, of a support 6 of a plastic cellulosic product, such as any well known composition of cellulose ester, ethers or the like, preferably cellulose acetate, upon one surface of which is a light sensitive gelatino-silver-halide layer 7.

The leader band 5 may be of any known or desired material and construction, such as the paper leader bands now in general use, and is attached to the sensitive surface 7 of the film by glue or other adhesive. On that surface of the leader band which constitutes a continuation of the sensitive surface 7, there is coated for a short distance adjacent the point of union of the two bands a thin layer of wax or wax-like substance 12.

The amount of wax necessary is very minute when every cartridge used is of this type, since the slideway acquires a sufficient accession of wax from each leader band to suffice for the sensitized film band following it. Moreover, since the slideways are usually made with the guideways contacting the film at the borders only, it is not always necessary to coat the entire surface. I have found that the placing of small deposits of wax 13 between a few perforations 11 only of the leader band 5 near its union with the sensitized band 4, assists very markedly in the easy running of the camera, which is noticeably better than when no wax is used.

Any soft solid lubricant, particularly a natural or artificial wax such as paraffine wax or beeswax, may be used, being applied in a hot, melted condition, or cold in a solvent such as carbon tetrachloride.

The specific forms herein disclosed are by way of example. It is obvious that numerous embodiments are possible, and I contemplate as within my invention all such modifications and equivalents as fall within the scope of the appended claims.

Having thus described my invention, what I claim as new and desire to secure by Letters Patent is:

1. A motion picture film strip including a band of sensitized material and a protective band, forming a continuation thereof and having a deposit of a soft, solid lubricant upon a small portion only of one surface of the protective band.

2. A motion picture film strip including a band of material having a sensitive layer upon one surface and a protective band forming a continuation thereof and having a deposit of wax over a small portion only of that surface of the protective band that constitutes a continuation of the sensitive surface of the band.

3. A motion picture film strip including a band of material having a sensitive layer upon one surface and a protective band forming a continuation thereof and having a deposit of wax over only a portion of that surface that constitutes a continuation of the sensitive surface of the band, and near the junction of the protective band and the sensitized band.

4. A motion picture film strip including a band of sensitized material and a protective band forming a continuation thereof and having a deposit of wax upon the marginal portion only of the protective band.

5. A motion picture film strip including a band of material having a sensitized surface and a protective band forming a continuation thereof and having a deposit of wax upon the marginal portions only of that side of the protective band that constitutes a continuation of the sensitized surface.

6. As an article of manufacture, a strip of coiled material adapted for use in a motion picture camera and including a coiled band with an unexposed, sensitized layer upon one surface and a protective band forming a continuation of the outer end of such coiled band and coiled around said band and having a deposit of wax upon a portion only of that surface of the protective band that constitutes a continuation of the sensitized surface.

7. As an article of manufacture, a strip of coiled material adapted for use in a motion picture camera and including a coiled band with an unexposed, sensitized layer upon one surface and a protective band forming a continuation of the outer end of such coiled band and coiled around said band and having a deposit of wax upon a portion only of that surface that constitutes a continuation of the sensitive surface and near the junction of the protective strip and the sensitized band.

8. As an article of manufacture, a strip of coiled material adapted for use in a motion picture camera and including a coiled band with an unexposed, sensitized layer upon one surface and a protective band forming a continuation of the outer end of such coiled band and coiled around said band and having a deposit of wax upon the marginal portions only of that surface of the protective band that constitutes a continuation of the protective strip.

Signed at Rochester, New York this 17th day of August 1926.

PAUL FAVOUR.